Figure 1:
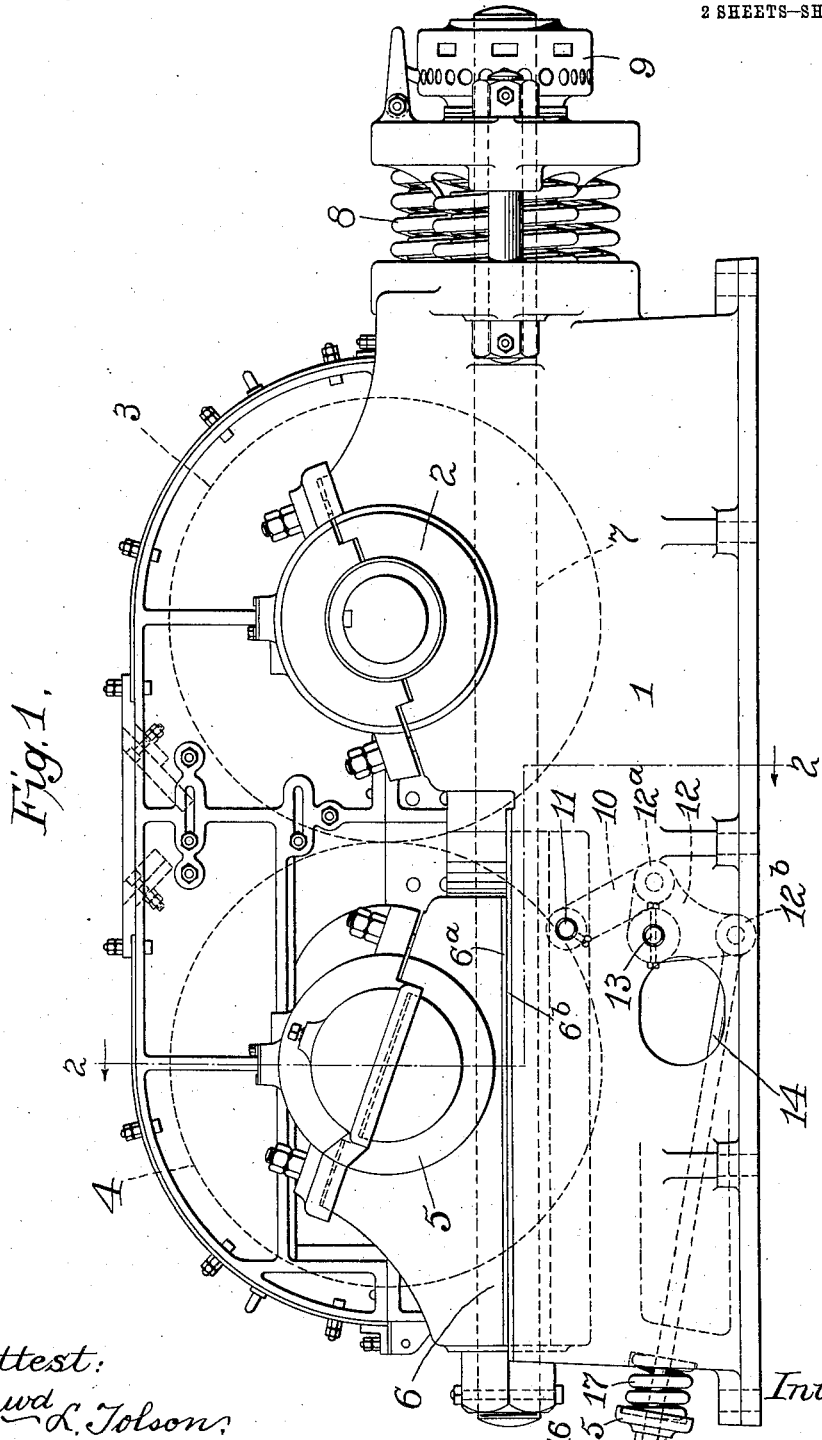

B. W. TRAYLOR.
CRUSHER.
APPLICATION FILED FEB. 28, 1913.

1,062,520.

Patented May 20, 1913.
2 SHEETS—SHEET 2.

Attest:
Ewd L. Tolson
C. E. Parsons

Inventor:
Bruce W. Traylor,
by Ffion Middleton Donaldson
Attys.

UNITED STATES PATENT OFFICE.

BRUCE W. TRAYLOR, OF ALLENTOWN, PENNSYLVANIA, ASSIGNOR TO TRAYLOR ENGINEERING & MANUFACTURING COMPANY, A CORPORATION OF DELAWARE.

CRUSHER.

1,062,520.      Specification of Letters Patent.      Patented May 20, 1913.

Application filed February 28, 1913. Serial No. 751,384.

*To all whom it may concern:*

Be it known that I, BRUCE W. TRAYLOR, citizen of the United States, residing at Allentown, Pennsylvania, have invented certain new and useful Improvements in Crushers, of which the following is a specification.

My present invention relates to improvements in crushing rolls of the type in which one of the rolls is mounted in slides so as to be movable toward and from the other or fixed roll under the tension of heavy springs, which allow the yielding of the roll in case hard, foreign substances are fed into the machine.

Owing to the heavy work to which crushing rolls of this type are subjected, the movable roll with its shaft and bearings have a tendency to bounce or vibrate on account of the varying load going through the machine, the tendency being for the end of the movable bearing toward the fixed roll to jump or bounce up whenever there is a momentary increase in the load or size of the material going into the machine. In the larger machines now in use and owing to the heavy work to which they are subjected, this vibration becomes excessive and causes great wear and tear on the main frame of the machine and the base of the movable bearings. While the T-shaped head of the bearing slide is fitted snugly into the recess in the frame, the constant, violent vibration soon causes it to become loose, thus greatly increasing the vibration, causing crystallization of parts of the machine, and the roll frame and the bases of the movable bearings become so badly worn that the life of the machine is greatly shortened. To lessen this wear, hard liners are sometimes introduced between the frame and the bases of the movable bearings. The use of liners, while reducing the wear and tear, does not effectually overcome the trouble, and I believe no one has thus far suggested or used any device for effectually holding down the movable bearings or boxes, at the same time permitting the same to slide freely upon the frame, as is most necessary for adjusting the distance between the rolls and to allow a yielding of the roll in case foreign substances are accidentally fed into the machine. To fully overcome this objection and do away entirely with the vibration and consequent wear and tear, I have conceived the idea of using a yielding mechanism connected with the movable bearings or boxes to hold the same down firmly on the frame, and such mechanism may be of any conceivable form or type, which will accomplish the purpose of providing a strong but yielding weight, tension or pressure on the movable bearings or boxes, but at the same time permit such bearings or boxes to move or slide freely back and forth along the frame. My preferred mechanism for accomplishing this purpose, which has the additional advantage of permitting easy and perfect adjustment while the machine is in operation, is illustrated in the accompanying drawings, in which—

Figure 2:
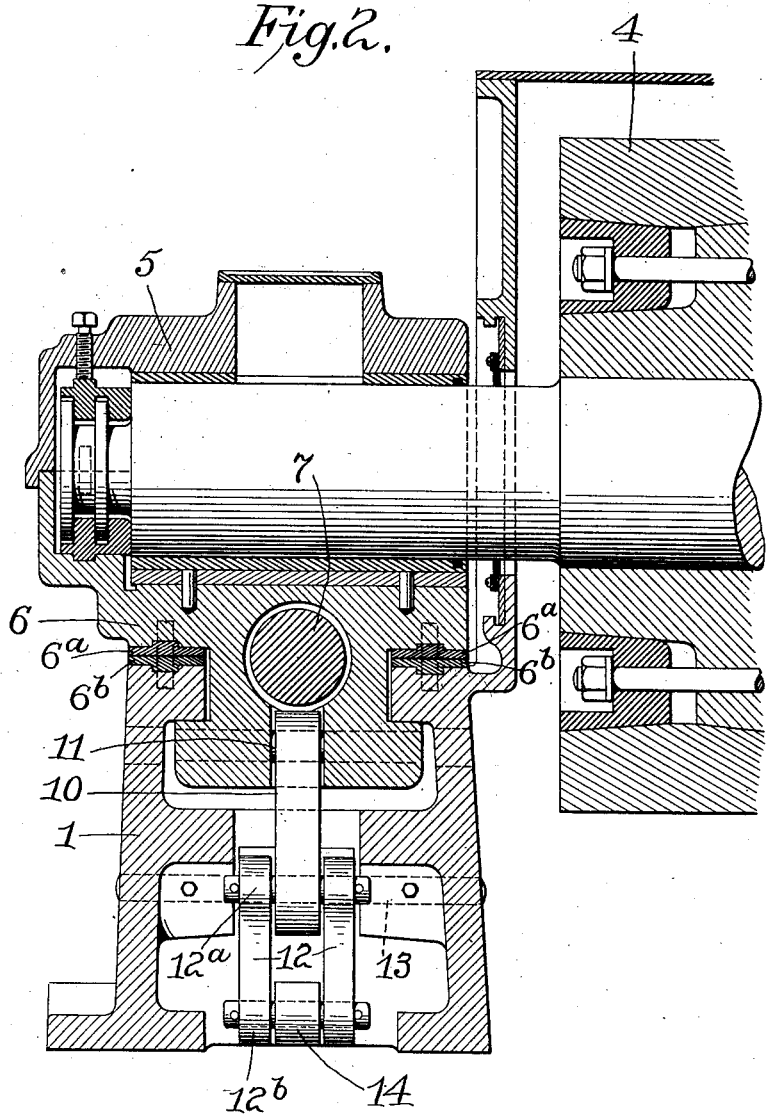

Figure 1 is a side elevation of a crusher embodying said improvements, and Fig. 2 is a section on line 2—2 of Fig. 1.

Referring by reference characters to this drawing, the numeral 1 designates the main frame of the machine, in which is mounted in suitable bearings 2 the stationary roll 3. The movable or yielding roll is indicated at 4 mounted in suitable bearings 5, carried by the slides 6. These latter are drawn toward the roll 3 by the rods 7 under the action of powerful springs 8, the tension of which may be adjusted by the adjusting heads or nuts 9. These parts constituting the machine are of the ordinary construction, and further and more specific description herein is deemed unnecessary.

In order to prevent the bearing slides 6 from jarring or vibrating on their liners, which liners are indicated at $6^a$ and $6^b$, I provide a yielding hold-down mechanism tending to hold the bearing slides 6 pressed down upon the bearing liners, and also provide means for varying the tension or force of such hold-down means. My preferred mechanism for accomplishing this purpose being the same on each side of the machine, a description of it in connection with one bearing slide 6 will suffice for both. It comprises a link 10 having its upper end pivotally connected by a bolt or rod 11 with the bearing slide, the lower end of the link being connected with the one arm $12^a$ of a bell crank lever 12 pivoted upon axis or shaft 13, the other arm $12^b$ being connected by a rod 14 with a tension device at the end of the crusher, such tension device being shown as comprising cap plate 15 and adjusting nut 16, and spring 17 interposed between the cap 15 and the main frame, so that by adjusting the tension of the spring 17 the force with which the bearing slide 6 is held down upon its seat or liner can be varied or adjusted.

Although I have described specific mechanism, it will be understood that I do not limit myself to this particular construction, as I may employ any other construction or means for securing the desired result without departing from the spirit of my invention.

Having thus described my invention what I claim is:—

1. A crusher having a pair of rolls journaled in relatively fixed and movable bearings, and yielding hold-down means for said movable bearings.

2. In a crusher, a roll mounted in stationary bearings, a second roll mounted in bearings slidable toward and from said first named roll, and yielding hold-down means connecting said slidable bearings with the bed of the machine.

3. A crusher comprising a pair of rolls journaled in relatively fixed and movable bearings, links connected to said movable bearings and depending within the main frame of the machine, and means for exerting tension upon said links.

4. In a crusher, a roll journaled in fixed bearings, a second roll, bearing slides supporting said second roll, so as to be movable toward and from the first roll, bell crank levers pivotally mounted in the machine frame below said movable bearings, links connecting said movable bearings with said bell crank levers, and rods provided with adjustable spring tension means connected to the other arms of said bell crank levers.

In testimony whereof, I affix my signature in presence of two witnesses.

BRUCE W. TRAYLOR.

Witnesses:
 H. BATTERSBY,
 E. M. MOYER.

Copies of this patent may be obtained for five cents each, by addressing the "Commissioner of Patents, Washington, D. C."